United States Patent [19]
Brown

[11] Patent Number: 5,344,051
[45] Date of Patent: Sep. 6, 1994

[54] TWO-COMPONENT FOAM DISPENSING APPARATUS

[75] Inventor: Daniel P. Brown, Palos Park, Ill.

[73] Assignee: Insta-Foam Products, Inc., Joliet, Ill.

[21] Appl. No.: 874,004

[22] Filed: Apr. 27, 1992

[51] Int. Cl.$^5$ .............................................. B67D 5/60
[52] U.S. Cl. .................................. 222/135; 222/145;
    222/183; 222/323; 222/402.14
[58] Field of Search ............... 251/6, 9; 222/135, 145,
    222/182, 183, 323, 325, 402.14

[56] References Cited

U.S. PATENT DOCUMENTS

| | | | |
|---|---|---|---|
| 3,575,319 | 4/1971 | Safianoff | 222/135 |
| 3,613,956 | 10/1971 | McCulloch | 222/145 X |
| 4,496,081 | 1/1985 | Farrey | 222/135 |
| 4,524,944 | 6/1985 | Sussman | 251/9 X |
| 4,603,813 | 8/1986 | Luegering | 239/399 |
| 4,880,143 | 11/1989 | Murray et al. | 222/135 |
| 4,958,750 | 9/1990 | Palmert et al. | 222/135 |
| 5,129,581 | 7/1992 | Braun et al. | 239/414 |

FOREIGN PATENT DOCUMENTS

| | | | |
|---|---|---|---|
| 4044979 | 2/1992 | Japan | 222/145 |
| 8903804 | 5/1989 | PCT Int'l Appl. | 222/145 |
| 1302577 | 1/1973 | United Kingdom | 222/145 |

OTHER PUBLICATIONS

Froth-Pak.
Handi-Foam (Mar. 1989).

*Primary Examiner*—Andres Kashnikow
*Assistant Examiner*—Kenneth Bomberg
*Attorney, Agent, or Firm*—Lockwood, Alex, Fitzgibbon & Cummings

[57] ABSTRACT

A foam dispensing apparatus particularly suited for consumer use includes two replaceable foam supply containers held within a carrier assembly and interconnected to a dispenser by way of a pair of flexible material supply tubes. The apparatus includes an actuating assembly by which both supply container valves may be opened in unison.

19 Claims, 8 Drawing Sheets

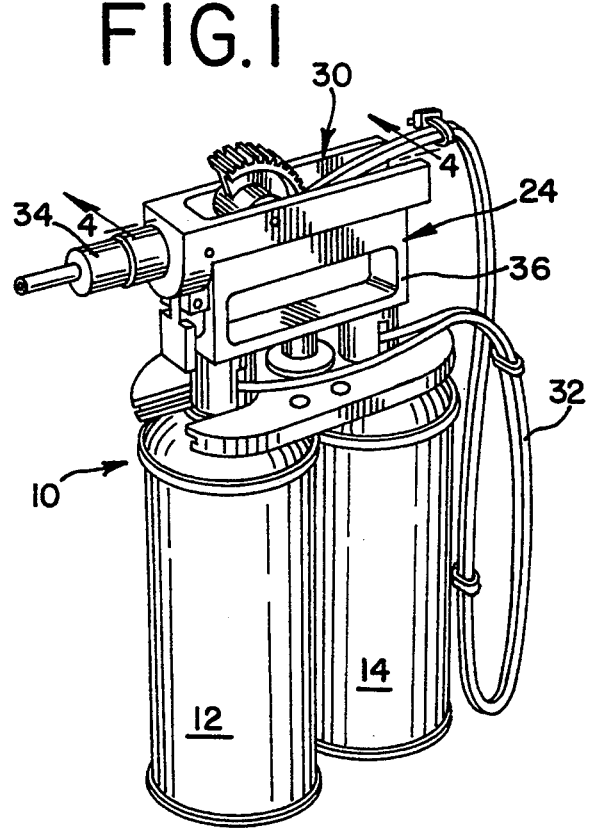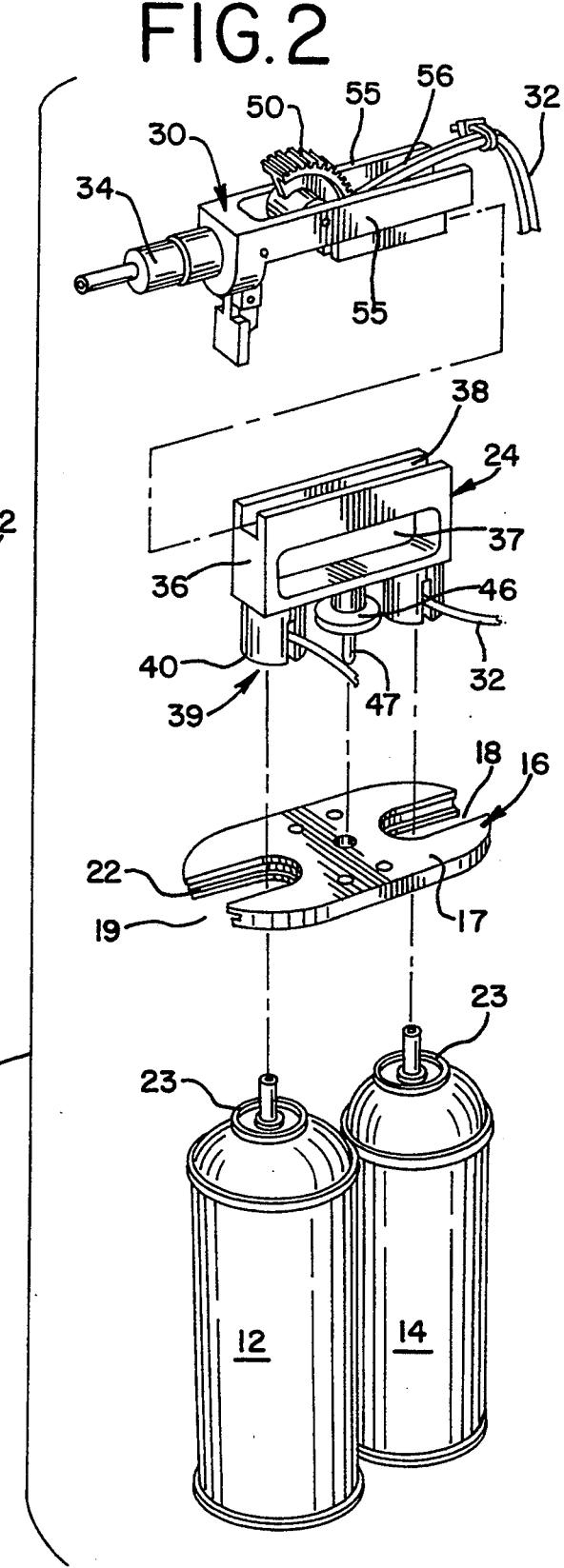

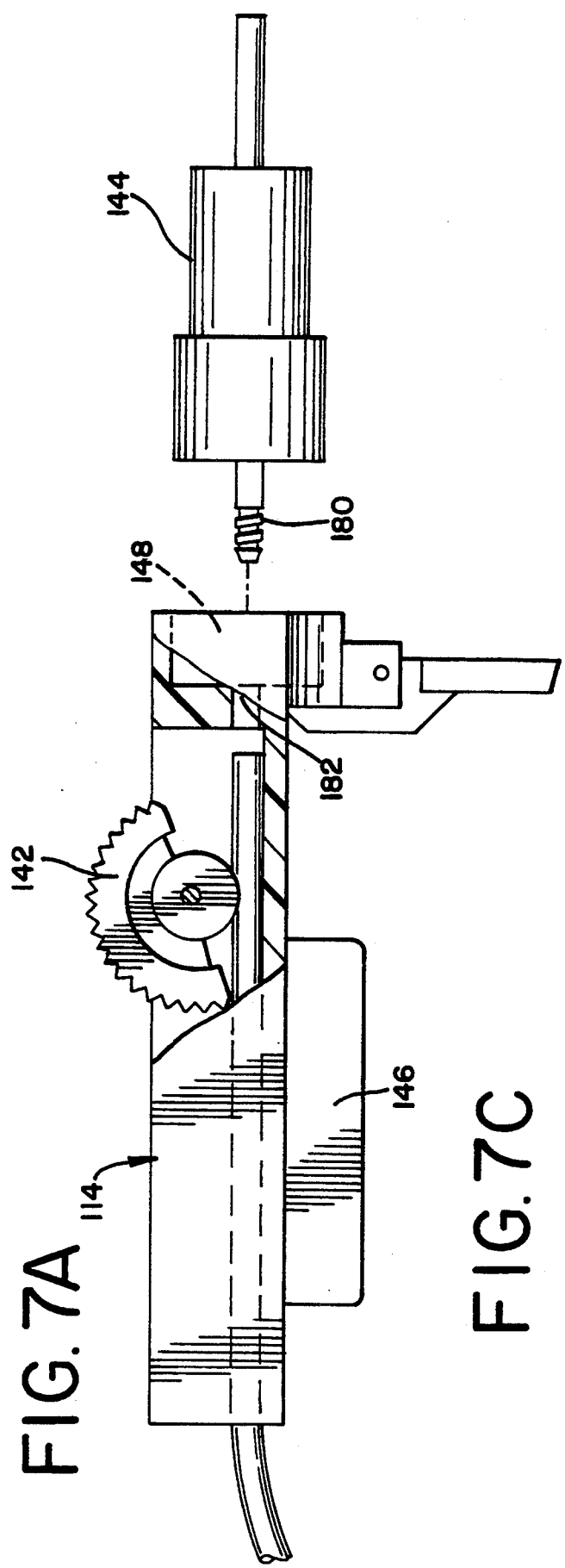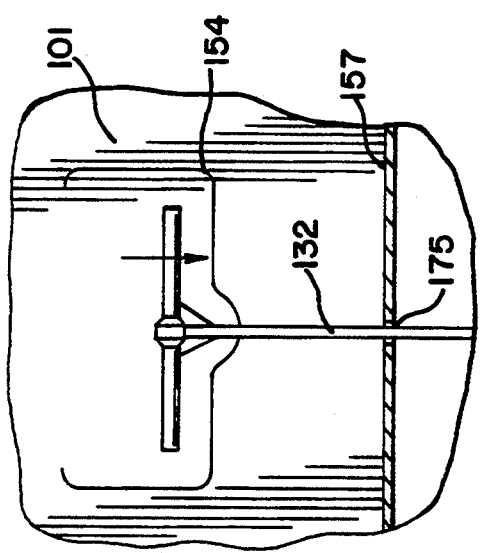

TWO-COMPONENT FOAM DISPENSING APPARATUS

BACKGROUND AND SUMMARY OF THE INVENTION

The present invention relates generally to foam dispensing apparatus, and more particularly to a hand-held or apparatus particularly suitable for use in dispensing two-component foams, such as urethane foams, wherein the apparatus includes a detachable dispensing assembly interconnected to the foam component supply which dispensing assembly may be positioned and used remotely from the foam component supply.

The use of urethane and similar expandable foams has increased over the years for numerous applications. Urethane foams are well known as having desirable characteristics useful for many applications, such as insulation. Urethane foams are also well known for their compatibility with low cost blowing agents which allow such foams to be applied by way of pressurized containers as well as their natural adhesive qualities which allow such foams to bond excellently to any number of substrates. Typically, urethane foams are the reaction product of two individual components, one being a foaming agent and the other being a resin. These two individual components when reacted together, give the resultant foam various chemical compositions, each such composition having significant utility in a particular application. Thus, urethane foams may be specially formulated to provide a final foam which is rigid, semi-rigid or flexible.

Closed cell urethane foams have particular utility in building and structural insulation while open cell urethane foams have particular utility in packaging or non-insulating purposes. Regardless of cell structure, two-component urethane foam are typically formed by mixing the two or more individual foam components together when the foam components exit respective supply containers. Individual material supply tubes leading from each foam component container convey the foam components to a foam dispensing apparatus, such as a nozzle.

The dispensing and mixing nozzle is typically part of an overall foam dispensing apparatus and may utilize a gun-like structure wherein a trigger assembly is used to dispense foam from the apparatus nozzle. The foam component containers are connected to the dispensing apparatus, whereby each component is conveyed from a respective separate container by an individual material supply tube into the dispensing nozzle. The two foam components are mixed together and the reacted foam is applied through the nozzle. The dispensing apparatus typically includes an inlet assembly which receives the foam components from the foam component supply containers, a body portion, an actuating means formed in the body portion such as a trigger assembly by which to control the dispensing of the foam, and a nozzle assembly having an opening from which the foam exits.

During operation of such dispensing apparatus, the separate foam components exit from their respective containers and enter a mixing chamber where they are blended together and expanded to form the urethane foam which then exits the spray nozzle at the outlet opening. Foam dispensing apparatus which are typical of the gun-like structures described above are disclosed in two of assignee's patents, U.S. Pat. Nos. 4,676,437 and 4,925,107. Another foam dispersing apparatus is disclosed in U.S. Pat. No. 3,784,110. For the most part, these foam dispensing apparatus utilize a somewhat complex foam dispensing gun member which is tethered to large foam component supply containers. These containers are somewhat bulky and cumbersome and may require excessive length material supply tubes for the dispensing nozzle to reach tight places. Additionally, such foam dispensing apparatus are complex and may surpass the understanding of an ordinary consumer.

The present invention is therefore directed to an easily assembled foam dispensing apparatus which overcomes the above-mentioned disadvantages. In the present invention, two foam component supply containers are held in place by an carrier assembly and the apparatus includes a dispensing assembly which is detachable from the carrier such that the apparatus is easily operable with either one or two hands.

In one principal aspect of the present invention, the entire dispensing apparatus is contained in a carton as a unit. The carton contains two foam component supply canisters and an actuating assembly in the form of two foam component supply tubes, each having a preselected length which is sufficient to permit a dispensing assembly attached to the supply tubes to be operated remotely from the carton while interconnected thereto. The material supply tubes, dispensing assembly and one or more detachable dispensing nozzles are positioned within a predesignated area within the carton so that the apparatus may be sold as a single unit. The carton not only functions as a carrier assembly for the dispensing apparatus, but also functions as a shipping container therefor.

In another principal aspect of the present invention, the dispensing apparatus includes a carrier which holds two foam component supply canisters in place and incorporates an actuating/handle assembly to ensure simultaneous release of the two foam components from their respective supply canisters through foam component supply tubes. The tubes extend to a foam dispenser which includes a dispensing nozzle. The dispenser detachably engages the carrier so that it may be detached and remotely operated away from the supply canisters adjacent a workplace such that it is easily operated with one or two hands. The carrier is capable of holding the supply canisters in place in either an upright or inverted orientation.

In still another principal aspect of the present invention, a pair of separate foam component supply canisters are received within a carrier assembly, the carrier assembly having means for conveying the contents of the foam component supply canisters to a separate foam component supply tubes which, in turn, convey the foam components to a dispensing assembly where they are mixed, expanded and dispersed by way of a nozzle member. The foam component supply tubes are of a length sufficient to permit detachment of the dispensing assembly from the apparatus and to permit the operation thereof remote from the foam supply.

In yet another principal aspect of the present invention, the foam dispensing apparatus includes a carrier assembly formed from a paperboard or cardboard carton which holds the foam supply component canisters in place and further provides a package for the entire dispensing apparatus. The supply canisters may be arranged in an inverted fashion within the carton and further interconnected to the dispenser by a pair of elongated foam component supply tubes. The dispenser includes means for detachably engaging the carton to permit the mounting of the dispensing assembly thereon such that at the option of the user, the apparatus may be used with the dispensing apparatus in place on the carrier or remote therefrom, the distance at which the dispenser can be used being governed by the length of the foam component supply tubes.

Accordingly, it is an object of the present invention to provide an improved, compact foam dispensing apparatus for dispensing two-component foams, which apparatus may be operated easily with one or two hands.

It is another object of the present invention to provide an improved foam dispensing apparatus having a foam dispensing member interconnected to two foam component supply canisters by a pair of supply tubes, the supply tubes conveying foam components to the foam dispensing member and permitting the dispensing member to be detached from the apparatus and operated remotely from the foam supply canisters adjacent a work area.

It is yet a still further object of the present invention to provide a simple foam dispensing apparatus which can be easily operated by an ordinary consumer in which the apparatus includes a carrier member containing two upright foam component supply containers the carrier member including a combined handle-actuating assembly, the handle-actuating assembly having means for aligning a pair of material supply tubes with the foam component supply containers and actuating the same to convey foam components from the supply container to a dispensing member which detachably engages to the carrier member to permit the dispensing member to be operated remotely from the carrier member.

Yet another object of the present invention is to provide a foam dispensing apparatus which includes a carrier assembly in the form of a carton, the carton containing two-inverted foam component supply containers and a foam dispensing assembly which detachably engages the carton, the dispensing assembly being interconnected to the foam component supply containers by series of foam supply tubes the carton further having manually actuable means to release the foam components from the supply canisters.

A further object of the present invention is to provide a foam dispensing apparatus which is easy to operate wherein the foam dispensing apparatus includes a foam dispenser having a digitally operable pivoting cam valve.

A yet further object of the present invention is to provide a carton blank which can be formed into a carrier assembly for a foam dispensing apparatus, the blank having means for positioning at least two foam component supply canisters within a first compartment, the blank having a second compartment, which when formed into a carrier assembly, contains means for maintaining an actuating assembly in an actuation position and the blank further having means for detachably engaging a foam dispenser.

These and other objects of the present invention will become more readily apparent from a reading of the following detailed description taken in conjunction with the accompanying drawings wherein like reference numerals indicate the parts.

BRIEF DESCRIPTION OF THE DRAWINGS

In the course of this detailed description, reference will be made to the attached drawings in which:

FIG. 1 is a perspective view of a first embodiment of an improved foam dispensing apparatus constructed in accordance with the principles of the present invention;

FIG. 2 is an exploded view of the foam dispensing apparatus of FIG. 1;

FIG. 7A is a partial sectional view of the foam dispenser used in the foam dispensing apparatus shown in FIGS. 1 and 5;

FIG. 7C is an enlarged view of a portion of the carrier assembly of FIG. 7B showing the interaction of the carrier assembly with the foam component release mechanism;

DETAILED DESCRIPTION OF THE PREFERRED EMBODIMENT

Figure 3:
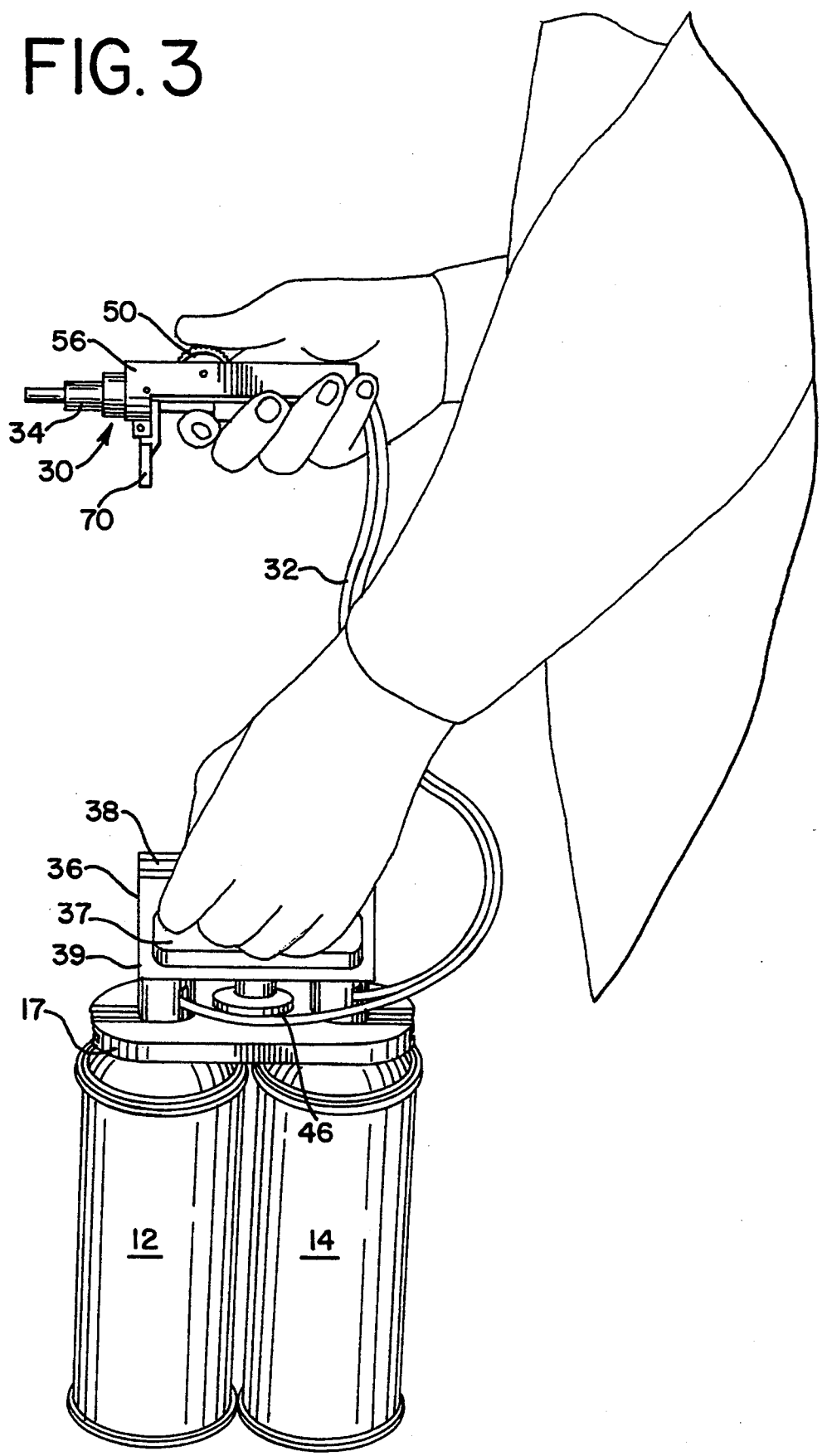
FIG. 3 is a general elevational view of the foam dispensing apparatus of FIG. 1, showing the two handed operation thereof by an individual.

Referring now to FIG. 1, one embodiment of an improved foam dispensing apparatus 10 constructed in accordance with the principles of the present invention is shown. The apparatus 10 is particularly suitable for the one or two-handed dispensing of multi-component polyurethane foams and the like. The apparatus 10 includes a pair of distinct, vertically arranged foam supply canisters 12, 14 which contain the foam supply components which, when mixed and reacted together form a foam. These separate containers 12, 14 store the liquid foam components of the foam, preferably in a pressurized state, one of the two components typically being an isocyanate component and the other component typically being a liquid resin solution.

The apparatus 10 includes a carrier assembly 16, shown as a plate or collar 17, which holds the supply canisters 12, 14 together in a vertical, spaced-apart relationship. The collar 17 may include suitable means which receives the foam component cans such as openings 18, 20, disposed at opposing ends, each of which has a groove 22 adapted to slidingly engage receive an end rim 23 of a respective foam component canister.

Figure 4:
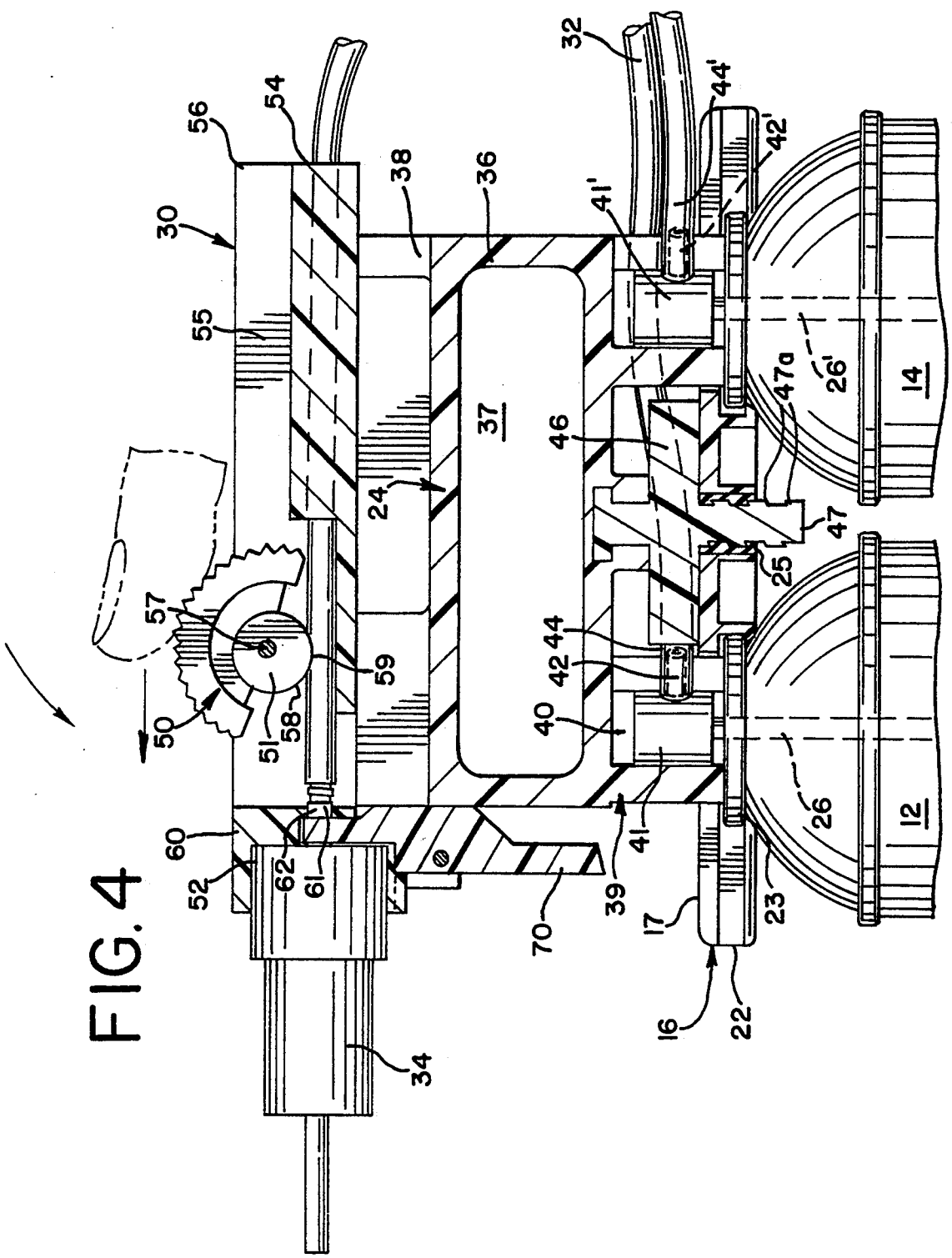
FIG. 4 is a partial sectional view taken through the carrier and dispensing assembly along lines 4—4 of FIG. 1.

The carrier assembly 16 also includes a foam component actuating mechanism 24, as best shown in FIG. 4, which engages both the collar 17 and the two supply canisters 12, 14 and which permits the user to release the foam components stored in the supply canisters 12, 14 for dispensing. The separate foam component supply canisters 12, 14 may take the form of small, individual aerosol cans which store the liquid foam components of in either a pressurized or non-pressurized state therein. The urethane foam components are conveyed to a dispensing assembly 30 by two individual foam component supply tubes 32 where they are mixed together and are then discharged or sprayed as an urethane foam through a dispensing nozzle 34.

The carrier assembly 16 also includes a handle portion, or cradle 36, having an opening 37 which can accommodate a portion of an operator's hand. The handle portion 36 includes an upper engagement slot 38 which slidingly engages the dispensing assembly 30 and a lower valve engagement portion 39. This valve engagement portion 39 includes two receptacles, or cavities 40, 40', which receive a pair of respective valve extension spray heads 41, 41' therein in a preselected, spaced-apart relationship. Each of the spray heads 41, 41' includes a stem portion 42, 42' which engages an inlet end 44, 44' of an associated supply tube 32.

The actuating mechanism 24 further includes a manually-operated actuator, shown as a thumbscrew 46 located proximate to the handle 36 and having a depending threaded stem 47 which is received by an opening 21 disposed in the collar 17. As best seen in FIG. 4, the thumbscrew stem 47, by way of its threads 47a, provides a reliable engagement with a complementary threaded insert 25 held in the collar opening 24 such that when turned, the thumbscrew 46 and its stem 47, draw the actuating mechanism 24 downward toward the collar 17 thereby aligning the spray heads 41, 41' with the stems of the supply canisters 12, 14. Further rotation of the thumbscrew 46 depresses the spray heads 41, 41' into a fluid-tight engagement with the supply canister stems and thereby opens the canister valves 26 so that the foam components flow unimpeded through the supply tubes 32. Because the supply canisters 12, 14 are in a vertical orientation, it is preferred that they contain dip-tube type valves wherein a tube extends downwardly into the canister to provide a path for the pressurized component to flow through.

Figure 7B:
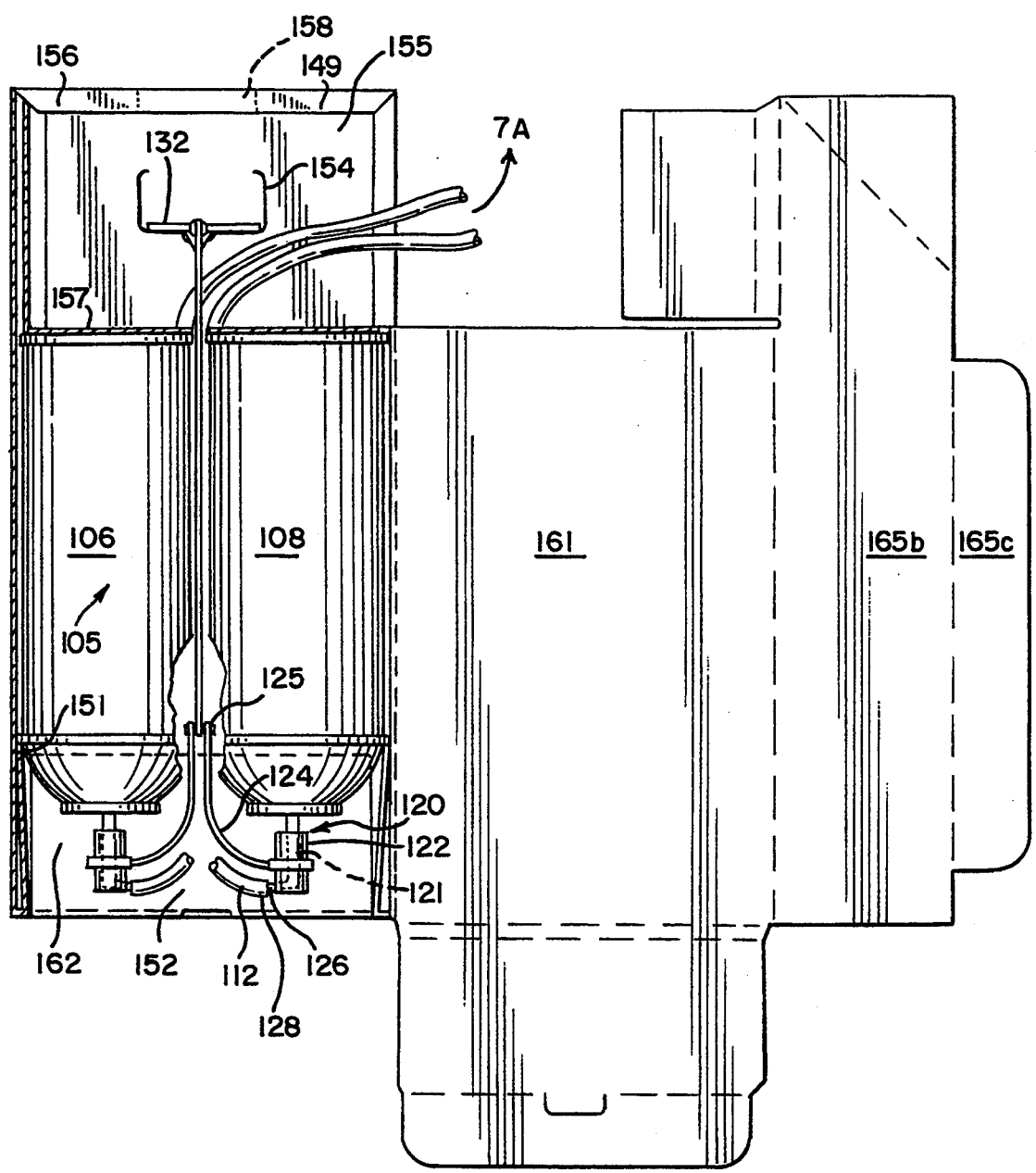
FIG. 7B is a partial plan view of the carrier assembly of the foam dispensing apparatus of FIG. 5, with a front flap of the carrier assembly being opened to show the components contained therein.

The foam components subsequently travel through the supply tubes 32 to the dispensing assembly 30 where the flow of the component through the supply tubes 32 is controlled by a manually controlled cam-style pinch valve 50 which is disposed in the dispensing assembly 30 between the nozzle receiving portion 52 thereof and the supply tube entrance portion 54. As best seen in FIGS. 4 and 7A, the pinch valve 50 is rotatably mounted between the sidewalls 55 of the dispenser body 56 and is eccentrically mounted on a pivot pin 57 so that a cam surface 58 is defined on an outer surface 59 thereof. Because the pivot pin 57 is offset from the center of the valve body 51, the cam surface 58 will contact the supply tubes 32 lying within the dispenser body channel between the sidewalls 55 thereof upon proper rotation of the valve body 51 and "pinch" them together to close them off simultaneously against a reaction surface 53 of the dispenser body 56 (shown as counter-clockwise in FIG. 4). This pinch valve construction is preferred to effect simultaneous opening and closing of the component supply tubes 32 to ensure that equal amounts of the isocyanate component and resin solution arrive in unison to the mixing and dispensing nozzle 34.

The supply tubes 32 terminate at an endwall, or partition wall 60, of the dispenser body 56 and connect with a pair of passages 61 which extend therethrough, only one of such passages being shown in FIG. 4. These passages 61 extend through the endwall 60 into the nozzle receiving portion 52, where they mate with nozzle inlet ports 62. The nozzle 34 may have construction similar to that disclosed in assignee's U.S. Pat. No. 4,603,813 or it may have a structure particularly suitable for dispensing reduced CFC and non-CFC foams as disclosed in assignee's patent application Ser. No. 694,249 now U.S. Pat. No. 5,129,581, both disclosures hereby being incorporated herein by reference.

Such a nozzle construction may include an inlet chamber wherein the foam components enter the nozzle 34, a mixing chamber wherein the components are mixed together and a reaction chamber wherein the components, after mixing, react into a foam which then exits the nozzle 34 by way of an outlet 35. The connection between the nozzle inlet ports 62 and the dispenser body passages 61 is preferably a fluid-tight relationship to ensure that the mixing of the two foam components entering the nozzle 34 occurs entirely therein. As such, the nozzle 34 is the only component of the dispensing apparatus 10 in which the foam components are mixed together. If, for whatever reason, the foam hardens within the nozzle 34, the nozzle 34 may be ejected from the nozzle receiving portion 62 of the dispensing assembly 30 by actuating an ejection lever 70 pivotally mounted within the dispenser body 56 to urge the nozzle 34 out of registration therefrom.

To operate the foam dispensing apparatus 10, the two foam component supply canisters 12, 14 are inserted into position within the collar 17. The dispenser assembly 30 is shut off by rotating the pinch valve 50 to close off the supply tubes 32. A nozzle 34 may then be inserted into the dispensing assembly 30 at the nozzle receiving portion 62 thereof. The spray heads 41, 41' are registered with the supply canister valves 26 and the thumbscrew 46 is rotated into the carrier plate opening 24 to activate the supply canister valves 26.

Figure 5:
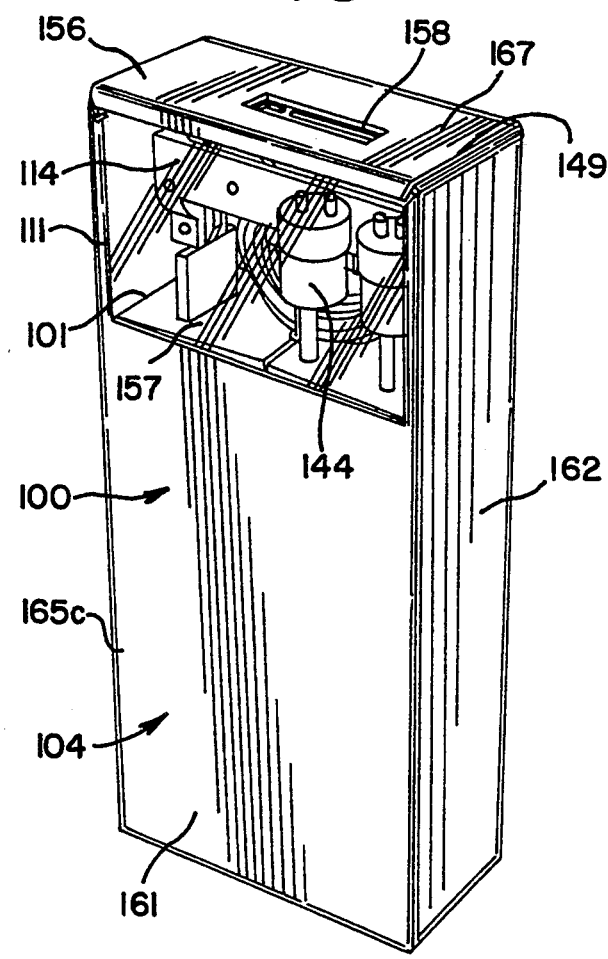
FIG. 5 is a perspective view of a second embodiment of a foam dispensing apparatus constructed in accordance with the principles of the present invention.
Figure 8:
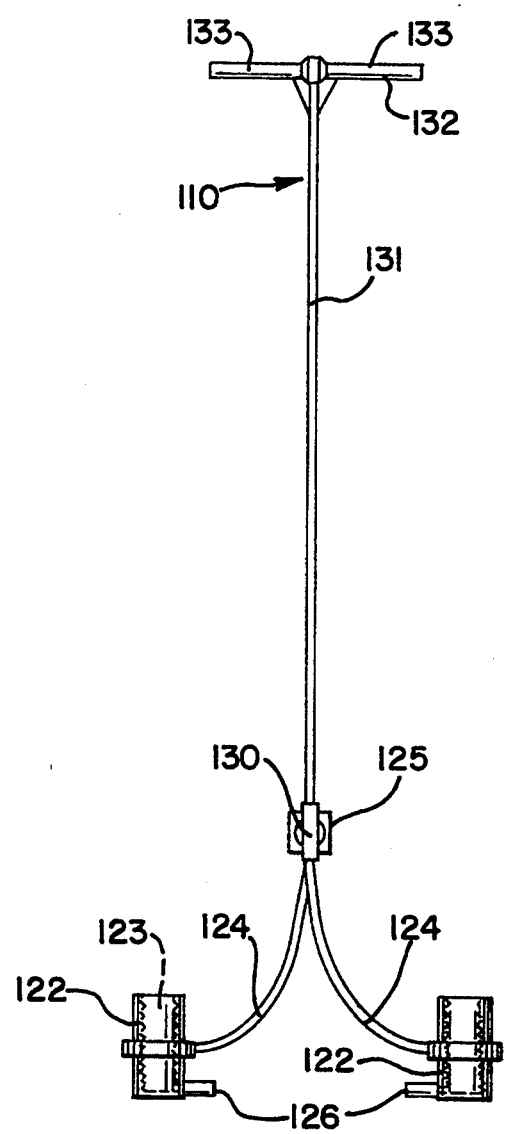
FIG. 8 is an isolated elevational view of the foam component release mechanism of the foam dispensing apparatus of FIGS. 7B.
Figure 6:
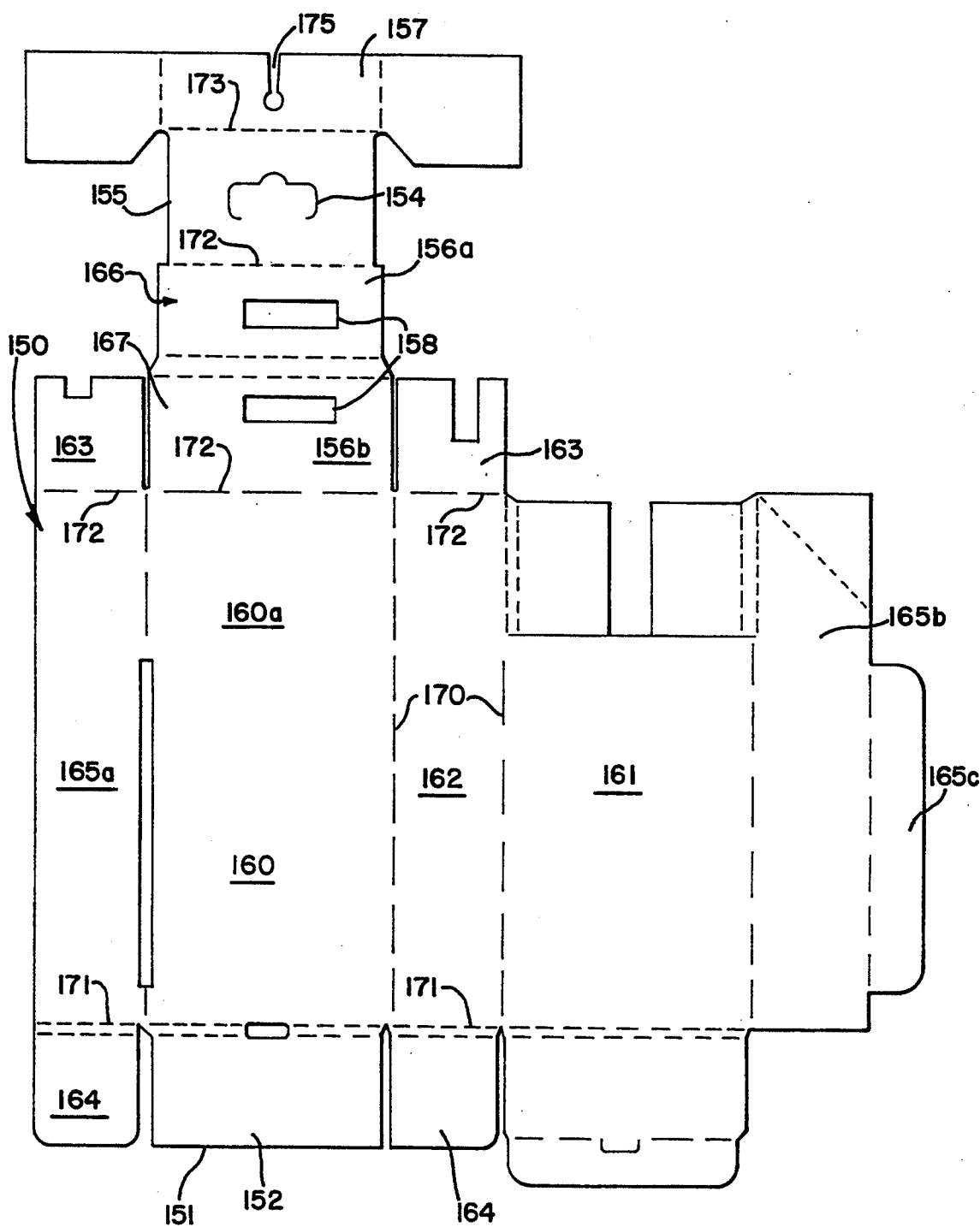
FIG. 6 is a plan view of a blank used in assembling the carrier assembly of the foam dispensing apparatus of FIG. 5.

FIGS. 5-12 illustrate a second embodiment of a foam dispensing apparatus 100 constructed in accordance with the principles of the present invention. As best seen in FIG. 5, the apparatus 100 includes a carrier assembly 102, such as carton 104 shown which is formed from a paperboard or cardboard blank 150. (FIG. 6.) Similar to the first embodiment 10, the apparatus 100 includes a pair of foam component supply containers 106, 108 (FIG. 7B) arranged alongside each other within the carrier assembly carton 104 in, an inverted manner. As mentioned previously, the supply containers 106, 108 store the liquid components in a pressurized state. A manually actuable foam component release mechanism 110 engages the foam component supply canisters 106, 108 and permits the operator to release foam components from the supply containers 106, 108 through a pair of foam component supply tubes 112 which lead to a dispensing assembly 114 where the foam components are mixed and subsequently discharged or sprayed through a nozzle 144 as a urethane foam.

In contrast to the first embodiment, the apparatus 100 has its foam supply canisters 106, 108 inverted. As such, the supply containers 106, 108 may each utilize a digitally operable valve 120 to release the contents thereof from the canister, such as a clayton valve, which opens upon deflection of the valve stem 121. In this regard, the foam component release actuating mechanism 110 extends through the carton 104 to the upper access compartment 101 for ease of actuation by the operator. The release mechanism 110 attaches to the foam component supply containers 106, 108 at a valve extension portion 122, each of which threadedly engages the canister valve stem 121. Each valve extension 122 contains an internal passage 123 which communicates with the valve stem 121 and which terminates in a nipple, or stem 126 which receives the inlet end 128 of a material supply tube 112. Each valve extension 122 further includes an arm 124 extending away from its body which terminates in an engagement loop 125 which engages a yoke portion 130 of the foam component release mechanism 110.

Figure 11:
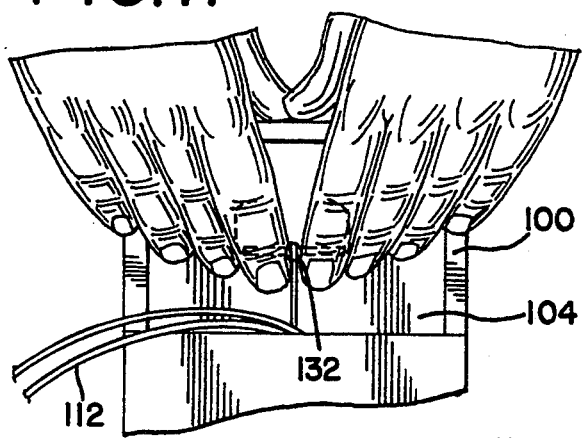
FIG. 11 illustrates the step of actuating the foam component release mechanisms to release the two foam components into the material supply tubes; and, FIG. 12 illustrates the step of two-handed operation of the foam dispensing apparatus of FIG. 5.

The two supply containers 106, 108 are preferably held in place within the carton 104 by a suitable means, such as a ledge 151 formed by an endflap 152 of the carton blank 150 (FIG. 6.) which preferably engages the outer rim 115 of the supply canisters 106, 108. Both supply containers 106, 108 are maintained by this ledge 151 within the carton 104 at a common elevation. The arms 124 of the valve extensions 122 are also of the same length such that they both engage the yoke 130 of the foam component release mechanism 110. The mechanism 110 further includes a pull bar 131 extending upwardly through the carton 104 into the upper access compartment 101 and terminating in a T-bar section 132 having two oppositely extending arms 133. Accordingly, to release the foam components from the supply canisters 106, 108, the operator merely has to manually pull on the T-bar 132 upwardly in FIG. 7B or downwardly as shown in FIG. 11, depending on the orientation of the carton 104. When pulled, T-bar 132 pulls the yoke 130 and its interconnected valve extension arms 124 with it. The valve extensions 122 are thus pulled toward each other to thereby trigger the canister valves 120.

Foam components are thus released through the valves 120 into the valve extensions 122 and further into the material supply tubes 112 where they are conveyed to the dispensing assembly 114. Similar to the dispensing assembly shown in FIG. 1, the foam components, dependent on the orientation of the digitally-operable pinch valve 142 will flow into the mixing and dispensing nozzle 144. In order to maintain the foam component release mechanism 110 in a open position wherein the supply canister valves 120 are open, the carton 104 may preferably include an engagement means in the form of a die-cut notch 154 which is disposed in an end wall portion 155 of the carton access compartment 101. The notch 154 is located at a preselected distance so that, when the T-bar 132 engages the same a constant tension force is exerted on the T-bar yoke 130 and the valve extension 122 connected thereto to keep the valves 120 open.

The top wall 156 of the carton 104 (and of the upper access compartment 101) may function as a convenient handle 14a to permit both one handed and two-handed operation of the dispensing apparatus 100. For one-handed applications, the dispensing assembly 114 is maintained in place on the carton 104 with the engagement ribs, or legs 146 in place within a dispensing assembly engagement slot 158 formed within the top wall 156 of the carton 104. As best seen in FIG. 6 this slot 158 extends through two flaps 156a–156b of the carton blank 150, which mate together when folded upon the appropriate foldline.

Figure 12:
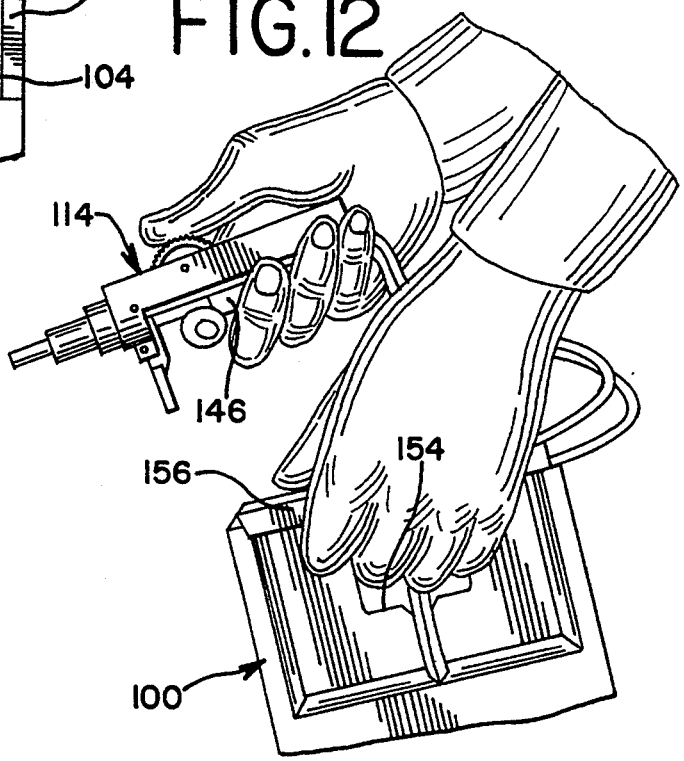

Alternatively, the operator may chose to detach the dispensing assembly 114 from the apparatus 100 by lifting the engagement legs 146 out of the carton slot 158. The dispensing assembly 114 is easily held in the palm of a user's hand and the pinch valve 142 thereof may be easily manipulated with a single finger, or thumb, as shown in FIG. 12.

Returning to FIGS. 5, 7B and 6, the carrier assembly 102 of the dispensing apparatus 100 may be easily formed from a one-piece paperboard or cardboard blank 150. As shown best in FIG. 6, the blank includes a carton rear panel 160 and a front panel 161 interconnected by a side panel 162, which when folded along foldlines 170 define the foam component supply internal compartment 105 of the carrier assembly 102. Various endflaps 163, 164 are folded in a conventional manner along associated foldlines 171 and are held in place when the front panel 161 is positioned over and parallel to the carton rear panel 160 and the interlocking side panels 165a, 165b are engaged when their associated tab 165c is inserted into slot 165d. As mentioned previously, end panel 152 is folded into the carton blank rear panel 160 to provide an engagement ledge 151 to maintain the foam component supply canisters 106, 108 in place within the lower compartment 105. In this regard, the lower endflaps 164 preferably hold the end panel 152 against the rear panel 160.

The upper access compartment 101 is formed by folding the top panel assembly 166 along its multiple foldlines 172 so that the first endwall panel 155 lies against the upper area 160a of the carton rear panel 160 in a manner such that the two top wall panels 156a, 156b abut each other as well. Extending outwardly from the access compartment endwall 155 is in a panel 157 which is folded upon foldline 173 to define a floor portion of the access compartment 101. This floor panel 157 includes a transverse slot 175 through which the foam component release mechanism T-bar 132 and the foam compartment supply tubes pass.

Figure 9:
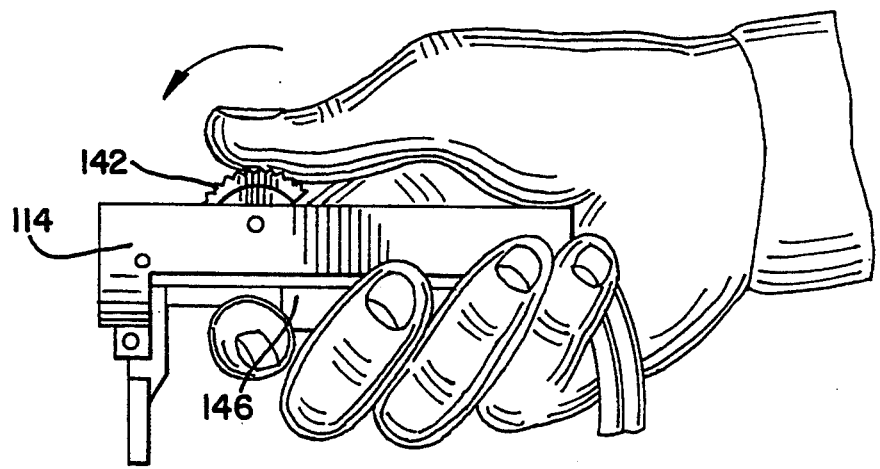
FIG. 9 illustrates the step of closing of the dispensing apparatus valve.
Figure 10:
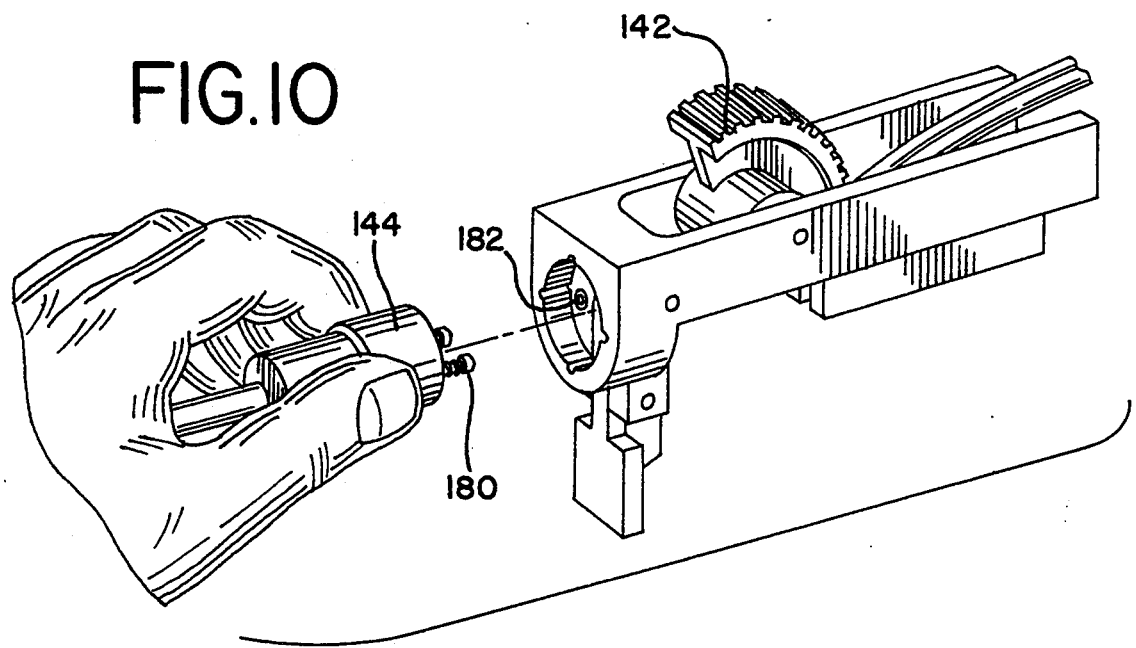
FIG. 10 illustrates the step of inserting a detachable nozzle into the dispensing assembly of FIG. 9.

The present invention provides a simple to operate and convenient foam dispensing apparatus, FIGS. 9 through 12 illustrate the general procedures for the operation of such an apparatus. First, the glassine or shrink-wrap cover 111 of the carton 104 is removed to gain access to the dispensing assembly 114 and nozzles 115 contained therein. The dispensing assembly 114 is removed from the carrier carton 104 and the pinch valve 142 thereof is rotated to ensure it is closed, as illustrated in FIG. 9. A nozzle 144 is inserted into the nozzle seat 148 of the dispensing assembly 114 such that the nozzle inlet stems 180 are securely received within the dispenser assembly body passages 182. (FIG. 10.) The foam components are then released into the supply tubes 112 by pulling on the T-bar 132 to actuate the release mechanism 110 (FIG. 11). The foam components are then introduced into the mixing and dispensing nozzle 144 by rotation of the pinch valve 142 (FIG. 11) to apply the foam through the nozzle 144 at a desired application rate.

It will be appreciated that the embodiments of the present invention that have been discussed herein are merely illustrative of a few applications of the principles of the invention. Numerous modifications may be made by those skilled in the art without departing from the true spirit and scope of the invention.

I claim:

1. A dispensing apparatus for dispensing a multi-component foam from two separate foam component supply containers, the apparatus comprising;
    a carrier assembly adapted to receive said two supply containers in a preselected orientation and a handle member which permits said apparatus to be carried by a user,
    a mechanism for actuating said apparatus to release foam components of said supply containers for the dispensing thereof,
    a dispenser for dispensing a foam mixed and reacted from the supply container foam components, the dispenser having a body portion containing a reaction surface and a valve member rotatably held by said body portion, the valve member having an outer cam surface thereon disposed proximate to said reaction surface, said valve member being operable between a first and second position, said dispenser including a member which detachably engages said carrier assembly and said carrier assembly includes a member for receiving said dispenser engagement member such that said dispenser may be operated either in place on said carrier assembly or remote therefrom,
    a pair of material supply tubes extending from said supply containers to said dispenser and further being disposed in said dispenser body portion between said cam surface and said reaction surface whereby, when said valve member is in said first position, said cam surface contacts said material supply tubes in a manner to prevent flow of foam components through said material supply tubes and when said valve member is in said second position, the flow of foam components through said material supply tubes is substantially unimpeded, said actuating mechanism further including an actuator for opening valves of said supply containers to release said foam components therefrom into said material supply tubes, said actuator being capable of maintaining said valves of said supply containers in an open condition by engaging a surface of said carrier assembly.

2. The dispensing apparatus of claim 1, wherein said carrier assembly includes a carton member having first and second compartments, said two supply containers being held in place within said first compartment in an inverted orientation.

3. The dispensing apparatus of claim 2, wherein said carton is formed from a cardboard blank.

4. The dispensing apparatus of claim 1, wherein said dispenser includes at least one engagement member extending from said dispenser body, the engagement member being received by a slot formed within said carrier assembly.

5. The dispensing apparatus of claim 1, wherein said actuating mechanism includes two valve extension portions interconnecting said two supply containers with said material supply tubes, each of the valve extension portions respectively receiving a valve stem of an associated supply container in a fluid-tight relationship therebetween whereby, upon actuation of said actuating mechanism, foam components are released from said supply containers into said material supply tubes.

6. The dispensing apparatus of claim 5, wherein said carrier assembly includes a carton having distinct first and second compartments, the first compartment receiving said supply containers, the carton having a passage extending between said first and second compartment, said actuating mechanism including an actuator, said passage receiving a portion of said actuator and said material supply tubes therein, said actuator being movable between a first and second position, and said second compartment further having an engagement surface which maintains said actuator in said second actuator position.

7. The dispensing apparatus of claim 6, wherein said actuator position maintaining means includes a pull bar having a yoke which engages said valve extension portion.

8. A dispensing apparatus for dispensing a foam formed by mixing and reacting at least two separate foam components, the apparatus being capable of one or two handed operation by a user thereby, the apparatus comprising, in combination:
    two separate supply containers, each container containing a foam component therein, each of the supply container having a valve which, when actuated, releases the foam component contained in said supply container;
    a foam dispenser assembly having a replaceable foam dispensing nozzle;
    a pair of elongated, flexible lengths of tubing extending between said dispenser assembly and said two supply containers forming two foam component passages therebetween;
    an actuating assembly for actuating the valves of said two supply containers in unison to release foam components from said supply containers through said tubing to said dispenser assembly; and,
    a carrier assembly for holding said supply containers in proximity to said actuating assembly, the carrier assembly detachably engaging said dispenser assembly whereby said dispensing apparatus may be operated with one or two hands, and whereby said dispenser may be operated either attached to said carrier assembly or remote therefrom, the carrier assembly including first means for selectively detachably engaging said foam dispensing assembly and second means for engaging said actuating assembly so as to maintain said supply container valves in an open condition.

9. The dispensing apparatus of claim 8, wherein said carrier assembly includes a carton member having a first compartment which receives said two supply containers in place therein in an inverted position, said tubing extending between said supply compartment and a second compartment defined in said carton which spaced apart from said first compartment, said second compartment having a passage which receives a portion of said tubing, said carrier assembly second engagement means including a surface of said second compartment which engages a portion of said actuator to thereby maintain said supply container valves in said open condition.

10. The dispensing apparatus of claim 9, wherein said carton includes a front panel and a rear panel, said supply compartment being defined between the carton front and rear panels, said carton further including at least one partition panel extending generally perpendicularly between said front and rear panels, said partition panel separating said supply compartment from said first compartment.

11. The dispensing apparatus of claim 9, wherein said actuating assembly includes a T-shaped pull bar interconnected to each of said two supply container valves, whereby exertion of force upon said pull bar opens said container valves in unison, said pull bar selectively engaging said second compartment when force is exerted thereon.

12. The dispensing apparatus of claim 8, wherein said dispenser assembly includes a dispenser body having a nozzle receiving portion adapted to receive said disposable foam dispensing nozzle therein in a fluid tight relationship in communication with said foam component supply tubing, said dispenser body further including a digitally operable pinch valve, the pinch valve having a pressure member rotatably mounted on said dispenser body proximate to a reaction surface thereof, the pressure member having a cam surface disposed on an outer surface thereof proximate to said reaction surface, said foam component supply tubing being disposed between said cam surface and said reaction surface, whereby upon rotation of said valve member in a preselected direction, said cam surface contacts said supply tubing and applies pressure to the same against said reaction surface to seal off said supply tubing in unison.

13. A self-contained unit for mixing and dispensing a multi-component foam from two aerosol containers, each of the aerosol containers containing at least one component of the multi-component foam, the unit comprising a carrier assembly holding said two aerosol containers in a preselected inverted orientation, the carrier assembly having a container compartment which receives said aerosol containers, the container compartment including at least one ledge portion against which said aerosol containers rest, the ledge portion maintaining said aerosol containers in said preselected inverted orientation within said carrier assembly, said carrier assembly further having a second compartment disposed generally adjacent said container compartment, the second compartment having a handle portion for grasping by a user, each of said aerosol containers having an outlet portion containing a discharge valve which discharges said foam component from said container upon application of pressure, the unit further including a detachable foam dispensing member interconnected to said aerosol containers by a pair of foam component supply tubes extending between said aerosol containers and the foam dispensing member, said carrier assembly further including a partition member separating said container compartment from said second compartment, the unit further including an aerosol container actuating mechanism having an actuator extending from said aerosol container discharge valves into said second compartment, the actuator engaging said two aerosol container discharge valves, whereby exertion of force upon said actuator applies pressure to open said two aerosol container discharge valves in unison to release said container foam components into said supply tubes, said second compartment including at least one sidewall having an engagement surface, said actuator having an engagement member which engages said engagement surface, thereby maintaining said container discharge valves in an open condition, said dispensing member further including a removable nozzle portion and carrier assembly engagement portion, said carrier assembly further including means for detachably engaging said dispensing member, said dispensing member also including a dispensing valve which rotatably engages said supply tubes.

14. The unit of claim 13, wherein said actuator includes a T-shaped bar.

15. The unit of claim 13, wherein said actuator includes a T-shaped pull bar having a yoke disposed opposite a T-end of said pull bar, the yoke engaging two spray heads in fluid-tight communication with said respective aerosol container discharge valves, said carrier assembly second compartment engagement surface including a notch which receives said pull bar T-end.

16. The unit of claim 13, wherein said dispensing member includes at least one engagement leg extending from said dispenser body and said carrier assembly engagement means includes a slot formed within said carrier assembly which receives said dispensing member engagement leg.

17. The unit of claim 13, wherein said actuator includes two valve extension portions interconnecting said two supply containers with said material supply tubes, each of the valve extension portions respectively receiving a valve stem of an associated supply container in a fluid-tight relationship therebetween whereby, upon actuation of said actuating mechanism foam components are released from said supply containers into said material supply tubes.

18. A dispensing apparatus for dispensing a multi-component foam from two separate foam component supply canisters, the apparatus comprising:
a carrier having first and second compartments defined therein, the first compartment holding said supply canisters and the second compartment defining a handle of said apparatus for grasping by a user, the apparatus also including a detachable foam dispensing member connected to said supply canisters by supply tubes, said first compartment having a ledge which maintains said supply canisters in an orientation within said carrier, said supply canisters each having a discharge valve which discharges a foam component from each supply canister upon application of pressure thereto, said apparatus further including an actuating means for applying pressure to said supply canister discharge valves to discharge the foam components from said supply canisters, the actuating means engaging said two aerosol container discharge valves, whereby application of force to said actuating means applies pressure to said supply canister discharge valves in unison to open same and release said foam components into said supply tube, said actuating means extending from said first compartment into said second compartment, said second compartment having at least one sidewall with an engagement surface which engages said actuating means to maintain said supply canister discharge valves in an open condition, said foam dispensing member further including a body, a replaceable nozzle in engagement with the body and a valve engaging said supply tubes, said carrier further including means for detachably engaging said dispensing member body.

19. The dispensing apparatus of claim 18, wherein said engagement surface includes a notch defined in said sidewall and said actuating mechanism includes at least one member which is received by said notch during actuation.

* * * * *